Oct. 14, 1958  G. A. LESCISIN  2,856,265
PURIFICATION OF SULFURIC ACID
Filed March 22, 1954
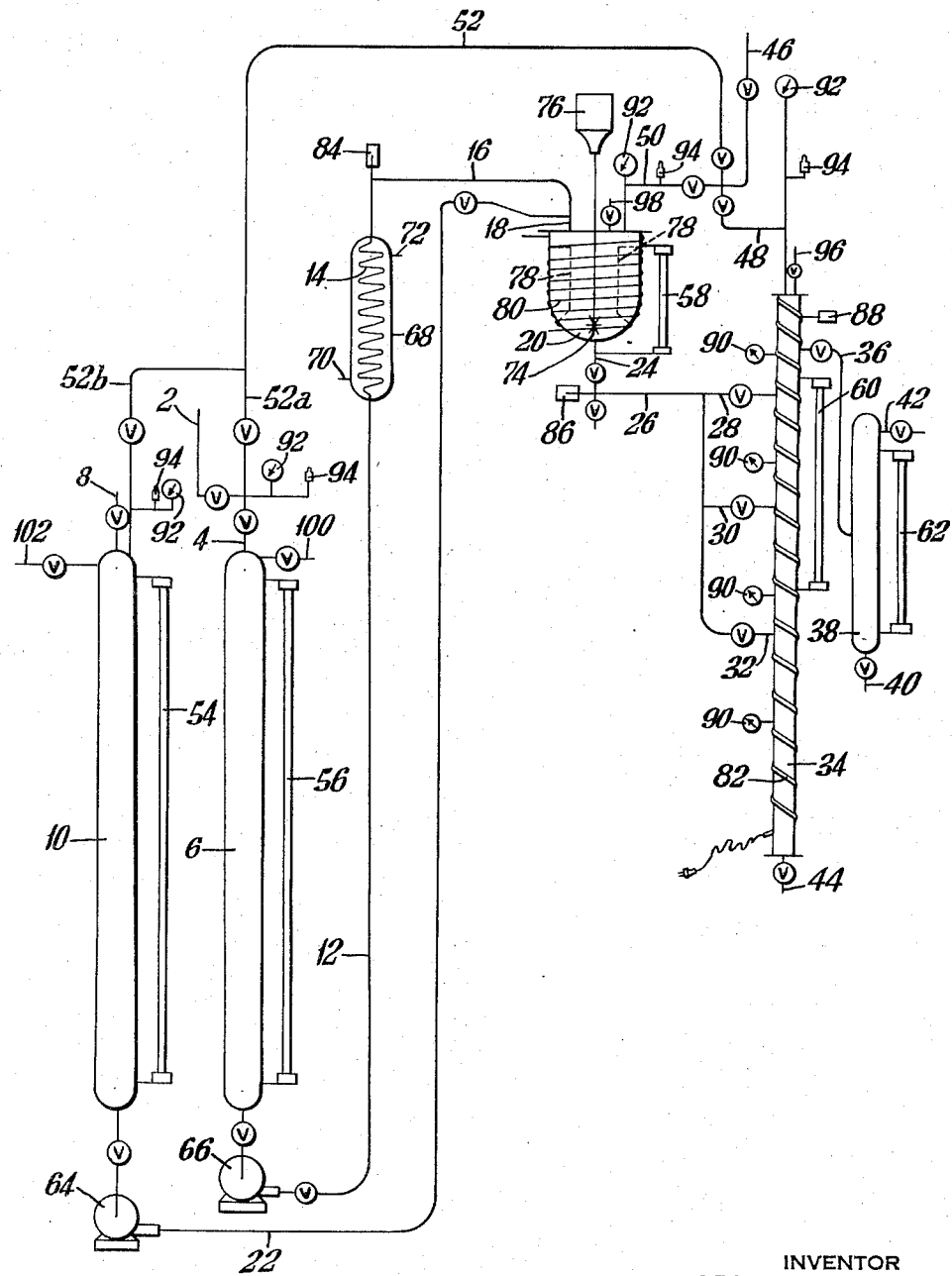
INVENTOR
GEORGE A. LESCISIN
BY
Fred. W. Dodson
ATTORNEY

United States Patent Office 2,856,265
Patented Oct. 14, 1958

2,856,265

PURIFICATION OF SULFURIC ACID

George A. Lescisin, South Charleston, W. Va., assignor to Union Carbide Corporation, a corporation of New York Application March 22, 1954, Serial No. 417,547

11 Claims. (Cl. 23—172)

This invention relates to the purification of sulfuric acid, particularly to the removal of carbonaceous oils and elemental carbon from acid which has been used for the production of alcohols.

In the production of an alcohol from an olefine, for instance in the production of ethanol from ethylene, the ethylene is reacted with concentrated sulfuric acid to give mono and di-ethyl sulfate which is then hydrolyzed with water to give ethanol and weak sulfuric acid from which mixture the ethanol is distilled, the sulfuric acid thereafter being concentrated and returned to the system for reaction with more ethylene. During the process various carbonaceous oils or tars are formed which may be referred to broadly as soluble carbon, and elemental carbon which may be referred to as insoluble carbon is also formed; and when the acid is concentrated in the presence of these carbons, sulfur dioxide is formed and acid is lost.

The present invention is directed primarily to the removal of these two types of carbon as well as other materials, for instance residual alcohol, from the sulfuric acid so that the acid is of sufficient purity to be re-cycled. In accordance with the process the impure acid is intimately mixed with an ether, represented by ethyl ether, at an elevated temperature and the hot mixture is fed into a vessel where layering occurs. The upper layer contains the majority of the carbon, ether, water, a little ethanol and a little acid while the lower layer contains the majority of the acid and ethanol, water, ether, and a little carbon. The layers are separated and the acid, ether and alcohol recovered from the mixtures in which they occur. The acid is concentrated in the presence of relatively little carbon so that the sulfur dioxide nuisance is considerably diminished and the loss of acid is reduced. These and other objects, features and advantages of the invention will be evident from the following description of the invention.

The accompanying sheet of drawing is a diagrammatic view of an apparatus suitable for practicing the invention.

Referring to the drawing, the impure acid from the alcohol distillation is brought through a valved conduit 2 into a valved pipe 4 from which it flows into an acid reservoir 6. The ether passes through a valved pipe 8 into an ether reservoir 10. From the acid reservoir the acid flows through valved conduit 12 and through a heating coil 14 and thence through conduit 16 to a pipe 18 where it enters a mixing chamber 20. The ether flows through valved conduit 22 to the pipe 18 where it mixes with the impure acid and enters the mixing chamber 20. The thoroughly mixed acid-ether mixture then passes through valved pipe 24 and pipe 26 to valved pipes 28, 30 or 32 whereby the mixture can be fed to the layering chamber 34 at any desired level. From the upper part of the layering chamber a valved pipe 36 conducts the ether layer to a reservoir or settling chamber 38 in which any sludge carried by the ether settles out to be withdrawn by the valved pipe 40, the fluid portion of the ether layer being withdrawn from the top of the settling chamber through valved pipe 42. From the layering chamber the acid with its associated water, carbon, ether and ethanol is withdrawn through valved pipe 44 for further purification and concentration of the acid so that the acid may be returned to the alcohol process. After purification of the ether which is withdrawn from the settling chamber 38 through the valved pipe 42, the ether is returned to the ether reservoir 10 through the pipe 8. Valved pipe 46 carries a gas for maintaining the system under such pressures as are desired, being distributed by valved pipes 48, 50, 52, 52a and 52b to the layering chamber 34, the mixing chamber 20 and the reservoirs 6 and 10, respectively. The valves are preferably of the pressure regulating type. Various auxiliary equipment is indicated on the drawing such as sight glasses 54, 56, 58, 60 and 62. The means for moving the ether and acid are indicated by the pumps 64 and 66 which serve not only to move the fluids but measure the amount of fluid which is moved, but any other suitable and equivalent means may be used; for instance the ether and acid may be moved by gas pressure from the pipes 52, 52a and 52b and the pumps 64 and 66 may serve merely as measuring instruments. Upon suitable placement of the reservoirs and various chambers gravity flow may be used. The heater for the acid is illustrated as a coil 14 within a jacket 68 holding steam or other heating fluid which is passed through the jacket between pipes 70 and 72 but the acid may be heated in any other manner, for instance by heat exchange equipment or electrical heating elements, around the coil 14. The mixing chamber 20 is provided with any suitable mixing device, a stirrer 74 driven by a motor 76 being illustrated, the baffles 78 assisting in the mixing but any other suitable means for mixing the ether and acid may be used, for instance gas from the pipe 50 may be bubbled through the ether-acid mixture for mixing the two components. The mixing chamber 20 is maintained at an elevated temperature, an electrical heating coil 80 being illustrated for this purpose but any other heating device may be used. For maintaining the layering chamber 34 at an elevated temperature an electrical heating coil 82 is illustrated but in this case also any other suitable heating means may be used. Thermometers or thermocouples 84, 86, 88 and 90 either simple, recording or regulating may be used to show or to regulate the temperature of the acid in the heater 14 or mixing chamber 20 or the various parts of the layering chamber 34. Various pressure gauges 92 and safety valves 94 may be used as desired. Valved pipes 96, 98, 100 and 102 serve to bleed gas at the points indicated if desired, the valves preferably being pressure regulating.

The operation of a process may readily be understood from the following example:

A typical impure acid obtained from the manufacture of ethanol has a specific gravity at 20° C. of 1.262, 35 percent by weight of sulfuric acid, 4.8 percent of ethanol, 59.39 percent of water and 0.81 percent of total carbon which is made up of 0.23 percent of soluble carbon that is the oils and soluble carbon compounds and 0.58 percent of insoluble or elemental carbon. The acid is passed from the reservoir 6 through the heating coil 14 and into the feed pipe 18. Ethyl ether, in such amount as to give 85 parts by volume of the impure acid (that is inclusive of the water, ethanol and carbon) to 15 parts by volume of ether passes from the ether reservoir 10 through the pipe 22 into the feed pipe 18 where it mingles with the acid and is fed together with the acid into the mixing chamber 20. The feed pipe 18 may contain any convenient arrangement of baffles or the like to provide a preliminary mixing of the ether and impure acid. The heating coil 14 through which the acid passes may conveniently be maintained at a temperature of about 105° C., for instance by the automatic control of the heating fluid passing through the jacket 68, this control being afforded by the thermometer or temperature control apparatus 84 so that the mixture of acid and ether enters the mixing tank at a temperature of 97°–100° C. The mixing tank is maintained at this temperature of about 100° C. and is under such autogeneous pressure of 100 lbs. p. s. i. g. (per square inch, gauge) that the contents of the mixing tank are maintained in the liquid state. If desired, nitrogen or other inert gas may be forced into the mixing chamber through the pipe 50 to maintain a pressure slightly higher than autogeneous. The temperature of the mixing chamber is conveniently maintained by control of the heating coil 80 by the temperature control device 86 which is set to maintain the effluent from the mixing chamber in the pipe 24 at the desired temperature. In the mixing chamber the ether and impure acid are very thoroughly mixed and are then passed into the layering chamber 34, which is preferably maintained at the same temperature and pressure as the mixing chamber. In the layering chamber the mixture of ether and impure acid forms two layers, the upper or ether layer containing the majority of the carbon and the bottom or acid layer containing the majority of the water and ethanol. The interface between the upper and lower layers in the layering chamber may be maintained at any desired point but it is found that the separation of carbon from the acid is better if the mixture of ether and impure acid is introduced into the layering chamber at a point above the interface so that the mixture of ether and acid enters the layering chamber in the ether layer, and the acid and water fall through the ether layer. For this reason the mixture of ether and impure acid is preferably introduced into the layering chamber through the upper valved pipe 28, the pipes 30 and 32 being provided for introduction of the mixture into the layering chamber at lower levels if desired. In the mixing chamber the ethyl ether removes, by solvation, the film of oil which is occluded as a film on the elemental carbon. This changes the density of the carbon and causes it to float into the ether layer; and by introducing the mixture of ether and impure acid into the upper or ether layer of the layering chamber, an excellent opportunity is afforded the ether to dissolve from the carbon any oil which was not dissolved in the mixing chamber and the carbon is afforded an excellent opportunity to float free from the acid and water as they fall through the ether layer. The rate of feed of impure acid from the reservoir 6 into the system is at the rate of 1.19 liters per hour per liter of space in the layering chamber 34 and at this rate approximately 69 percent of the total carbon in the original acid is removed.

The other layer which forms in the layering chamber is removed through the pipe 36 into the reservoir or settling chamber 38 in which sludge carried by the ether (for instance entrained water and acid) settles to the bottom of the chamber from which it is withdrawn by the pipe 40 and usually discarded. The top layer which is withdrawn from the settling chamber through the pipe 42 is subjected to a simple distillation at atmospheric pressure at a maximum kettle temperature of 110° C., ether being collected to a vapor temperature of 40° C., ethanol to 85° C. and oil to 99° C. The ether may be returned to the ether reservoir 10. The alcohol may be collected and returned to the alcohol process at the point where the ethyl sulfates are hydrolyzed or where the crude alcohol is distilled. The oil is usually discarded. The volatiles from the top layer having passed off leave a small amount of aqueous acid as a residue. The acid was recovered as a clear liquid, in one case by filtering off the carbon and in another case by diluting with water, allowing the carbon to settle and decanting off the dilute acid or filtering off the carbon from the dilute acid. The residues withdrawn from the settling chamber 38 through the pipe 40 may similarly be treated, if desired. The acid thus recovered may be used as acidified water in the hydrolysis of the ethyl sulfates in the production of the ethanol or the acid may be concentrated. Less than 1 percent of the contained acid was lost in the carbon sludge from the upper layer.

From the bottom of the layering chamber, the acid-water layer containing some ether, ethanol and carbon is withdrawn through the pipe 44 for concentration of the acid. In concentrating the acid the components are volatilized successively as previously stated, the ether being collected and returned to the reservoir 10, the alcohol being returned to the alcohol process and the distilled oil being discarded. Any carbon may be removed as previously described. A simple heating of the dilute aqueous acid obtained from the bottom layer of the layering chamber 34, at atmospheric pressure to a kettle temperature of 295° C., gave a clear concentrated acid of a red or amber color. The loss of contained acid was about 2 percent as compared with losses of from 8 to 9 percent of contained acid on samples of acid which had not been subjected to the ether process herein described and there was little sulfur-dioxide nuisance. In an efficiently operated process there is so little acid in either the residue from the bottom of the settling chamber 38 or the residue from the distillation of ether, ethanol and oil drawn from the top of the settling chamber through the pipe 42 that these residues are discarded without attempting to recover the acid; and there is so little carbon in the lower aqueous-acid layer drawn from the bottom of the layering chamber 34 through the pipe 44 that the acid is concentrated without attempting to remove the last trace of carbon, such ether, alcohol and volatile oil as distill during the heating of the acid for concentration being collected as an incident to the concentration of the acid.

When operating under the conditions described herein, that is, where the sulfuric acid has been used in a process of producing ethanol and ethyl ether is the purifying medium, the acid content of the impure acid is preferably between 30 percent and 40 percent by weight and the ethanol content usually runs between 3 percent (or less) and 6 percent, these relative weights representing the range of these materials which are likely to be found in the acidic tails from any well run process for the production of ethanol. Where the alcohol content is higher than 6 percent the volume of ether used should be correspondingly increased, 15 parts by volume of ether working well with 85 parts of impure acid containing 6 percent by weight or less of alcohol. Acids containing up to 15 percent by weight of alcohol or more can be treated by the process, using sufficient ether to produce layering in chamber 34, but such an acid represents an inefficiently operated distillation in the alcohol process. If the acid content of the impure acid runs much higher than about 40 percent by weight, for instance to 50 percent, the acid is so strong that, although the process is operable, the solvent action of the ether for the acid-soluble materials as well as for the oil film on the elemental carbon is slowed and if the acid content is extremely low, for instance about 1 percent, the gravity of the acid is so low that the flotation of the carbon is slowed. Although such dilute acids may be treated they represent an excessive and unnecessary addition of water in the hydrolysis of the ethyl sulfates and higher evaporation costs when concentrating the acid for recycling.

With respect to the details of the process, the mixing of the ether and impure acid should be as thorough as possible to afford the ether ample opportunity to dissolve the acid soluble materials and the occluded oil layer from the elemental carbon. The agitation may be quite violent but as it is desired to minimize the disintegration of any agglomerates of elemental carbon into a colloidal form the agitation should stop short of colloidalization of the carbon. It is preferred that the agitation be such that the feed of ether and impure acid is thoroughly dispersed upon entering the mixing chamber and for this reason operation of the propeller in the mixing chamber or the ebullition of nitrogen through the contents of the mixing chamber is preferably such that the liquid is forced toward the top of the chamber. Proper agitation of the contents of the mixing chamber results in the removal of carbon in a tarry form in the ether layer of the layering chamber. Solid particles of carbon may appear at the interface in the layering chamber and the aforementioned small amount of carbon may appear in the lower acid-water layer of the layering chamber but the major portion of the carbon will be found in the upper or ether layer of the layering chamber.

With respect to temperature, the higher the temperature the greater the permissible rate of feed with efficient purification of the acid; however, the process operates well at a temperature of 95° C. to 100° C. or about the temperature at which there is relatively little vaporization of the water. The process is operative at mixing chamber and layering chamber temperatures as low as 0° C. and pressures as low as atmospheric and may conveniently be operated at room temperature (20° C.) but the efficiency is low. At 25° C. and atmospheric pressure the maximum rate of feed with efficient purification of the acid was 0.49 liter of impure acid per hour per liter of space of the layering chamber as compared with the aforesaid 1.19 liters per hour where the temperature was 100° C. The temperature of the mixing chamber and layering chamber are conveniently and preferably the same. The equilibrium temperatures and pressures for mixtures of 85 volumes of aqueous 40 percent sulfuric acid and 15 volumes of ethyl ether are:

| Temperature °C.: | Equilibrium pressure p. s. i. absolute |
|---|---|
| 97.5 | 90 |
| 93 | 79.5 |
| 70.5 | 42.8 |
| 48 | 21 |

The pressures are preferably autogeneous and are conveniently the same throughout the system except that where the acid and ether are pumped by gas, the reservoirs 6 and 10 must be at sufficient pressures to move the liquids against the pressure in the mixing chamber. An artificial increase in pressure in the mixing chamber by the use of nitrogen had little effect. A decrease in pressure in the layering chamber from that in the mixing chamber may result in an ebullition effect which subsequently may cause the carbon to remain in a colloidal suspension in the bottom portion of the layering chamber. For this reason the pressures in the mixing chamber and the layering chamber are preferably the same but the temperature in the settling chamber 38 is lower than in the layering chamber to promote, in the settling chamber, the settling out of aqueous sulfuric acid. Conveniently, the settling chamber may be maintained at room temperature, about 20° C., which assists in causing any carbon in the settling chamber to collect in the small amount of acid which collects in the bottom of the settling chamber. The pressure of the settling chamber is conveniently the pressure of the layering chamber 34 but may be lower, pipe 36 being suitably valved. While the temperature of the mixing chamber and the layering chamber are preferably the same, any heat loss in the layering chamber results in a corresponding diminution in the pressure which may be eliminated by the use of nitrogen or other inert gas admitted through the pipe 48.

For efficient operation of the process 15 volumes of ethyl ether should be used with 85 volumes of impure acid of the composition previously given. More or less ether may be used but if the amount of ether is increased there is relatively little increase in efficiency in the purification of the acid and if the amount of ether is decreased the efficiency of the process is lowered. Using 10 volumes of ether to 85 volumes of impure acid in the feed effected a purification of the acid but the action was slow from a practical point of view. Using 25 volumes of ether to 75 volumes of impure acid (28.4 ether to 85 acid) effected a separation equally as well as using the 15 ether to 85 acid ratio but there were larger volumes of fluids to handle and more ether to distill per liter of acid treated.

With respect to the rates of feed, and assuming that an optimum temperature of 95° C. to 100° C. is used, the larger the mixing chamber and the more efficient the mixing of the ether and impure acid, the higher the through-put per liter of layering-chamber space. A decrease in feed rates facilitates separation and it is a matter of pilot runs in the practical operation of the process in a particular apparatus to determine the volume of the mixing chamber, the length of time of mixing and the amount of agitation to be used on the basis of the volume of the layering chamber for most efficient separation. Batch operation of the process, particularly the provision of a plurality of mixing chambers feeding successively into the layering chamber, gave a removal of 85 percent of the total carbon. This is due to the fact that each batch can be thoroughly mixed in the mixing chamber before it is fed to the layering chamber whereby the feed to the layering chamber contains substantially no insoluble carbon from which the ether has not dissolved the soluble carbon oils. Where the feed into and from the mixing chamber is continuous there is more opportunity for the passage into the layering chamber of insoluble carbon from which the soluble or oil carbon has not been dissolved, this opportunity being decreased, however, the larger the mixing chamber. In the runs giving the 85 percent removal of total carbon, the 15 to 85 ratio of ether to impure acid, was used at a temperature of 75° C. and an autogeneous pressure of 70 p. s. i. g. at a feed rate of 5.38 liters of impure acid per hour per liter of space in the layering chamber, the feed to the layering chamber being continuous but the mixing being done in batches for a period of 2 to 4 minutes per batch. The acid was the same as used in the continuous run where the feed was 1.19 liters of impure acid per hour per liter of space in the layering chamber.

With respect to the point of feed of the acid-ether mixture from the mixing chamber into the layering chamber, the feed is preferably sufficiently below the top of the surface of the fluid in the layering chamber to prevent acid and water from being mechanically carried out of the top of the layering chamber through the pipe 36 with the effluent ether and as little acid is maintained in the bottom of the layering chamber as is possible so that the feed into the layering chamber falls through as long a column of upper or ether layer in the layering chamber as is possible; in other words, for a given feed of acid and ether into the layering chamber, the feed should be through pipe 28 to give the acid the longest fall through the upper or ether layer in the layering chamber; but if any considerable amount of acid say more than 10 percent of the acid charged into the mixing chamber shows in the effluent through the pipe 36, the feed should be through the pipe 30 or even through the pipe 32 (or the layering chamber should be enlarged or the rate of feed decreased) so that acid is not entrained and washed out of the layering chamber by the effluent ether. Also, if too much ether shows in the acidic effluent from the bottom of the layering chamber the level of the interface between the layers in the layering chamber should be raised to afford the ether a better opportunity to separate from the aqueous acid. To determine optimum results is merely a matter of pilot runs to determine optimum conditions for the apparatus employed.

In the practice of the process, sufficient solvent and type of solvent is used as will wash the layer of soluble carbon oil off of the insoluble carbon and preferentially hold the soluble carbon in solution as against the aqueous acid and form a layer separate from the acid. Sufficient liquid and type of liquid is used as will float the insoluble carbon and form a layer separate from the acid. The ether is at once a solvent for the oil, a fluid to float the insoluble carbon, and is of low solubility in the acid, and has a boiling point sufficiently below water that it may easily be separated from water and acid by a simple distillation for recycling.

Instead of the ethyl ether disclosed herein other solvents and flotation agents which may be used are n-propyl ether, isopropyl ether, n-butyl ether, isobutyl ether, and mixed aliphatic ethers, the pressures used in the system being autogeneous or slightly higher depending upon the solvent used. The desirable characteristics of the solvents and flotation agents are: density less than that of the impure acid, high solvency for the soluble carbons of the impure acid, insolubility or substantial insolubility in water or the impure acid, unequivocal composition, cleanly separable from any other component of the system which is not to be recycled or is to be recycled separately from the agent so that the agent may easily be recovered in a sufficiently pure condition to be recycled, non-reactive with the other components of the system so that the agents do not consume acid and neither they nor their reaction products become contaminants and, preferably, high vapor pressures and boiling points at least 5° C. from any other component of the system which is not to be recycled or is to be recycled separately from the agent. The boiling points of the agents are preferably well below 100° C. so that the agents may be distilled from the acid while the acid is quite dilute. In the case of the butyl ethers and extremely dilute (1 percent) aqueous acid a portion of the water may distill before the ether but the acid is so tenacious with respect to water that the ether will distill before the acid becomes highly concentrated.

The process has been disclosed herein in connection with purification of acid resulting from the production of ethanol but may also be used in connection with any impure acid from which it is desired to remove soluble or insoluble carbon, for instance acid used in the production of isopropanol, n-propanol, n-butanol and isobutanol, the purification of hydrocarbons (gasoline processes) and acid sludges from pickling, and the purification of organic acids and anhydrides.

What is claimed is:

1. Method of separating sulfuric acid from elemental carbon and oils contained in a composition comprising water and ethanol together with said acid, carbon and oils which method comprises mixing the composition at a temperature between 0° C. and 100° C. with sufficient diethyl ether to form a layer which is predominantly said ether having oil from the composition in solution and elemental carbon from the composition in suspension and separating said layer from the remainder of the composition.

2. Method of separating sulfuric acid from elemental carbon and oils contained in a composition comprising water and ethanol together with said acid, carbon and oils which method comprises mixing the composition at a temperature between 25° C. and 100° C. with sufficient diethyl ether to form a layer which is predominantly said ether having oil from the composition in solution and elemental carbon from the composition in suspension, passing the mixture of said ether and said composition into a layering chamber maintained within said temperature limits, maintaining the mixture in the layering chamber in a relatively quiescent state whereby formation of said ether layer is facilitated and another layer is formed comprising water and acid from said composition and separating the layers.

3. Method of separating sulfuric acid from elemental carbon and oils contained in an impure acid composition comprising from about 1 percent to 50 percent by weight of acid together with water and said carbon and oils which method comprises mixing the composition at a temperature between 25° C. and 100° C. with from 10 to 25 parts by volume of diethyl ether per 85 parts by volume of said impure acid composition, maintaining the mixture of ether and said composition in a relatively quiescent state to facilitate the formation of an upper layer which is predominantly ether having oil from the composition in solution and elemental carbon from the composition in suspension and a lower layer comprising water and acid from the composition and separating the layers.

4. Method of separating sulfuric acid from elemental carbon and oils contained in an impure acid composition comprising from about 1 percent to 50 percent by weight of acid together with water and said carbon and oils which method comprises mixing the composition at a temperature between 25° C. and 100° C. with from 10 to 25 parts by volume of diethyl ether per 85 parts by volume of said impure acid composition, maintaining the mixture of ether and said composition within said temperature limits in a relatively quiescent state to facilitate the formation of an upper layer which is predominantly ether having oil from the composition in solution and elemental carbon from the composition in suspension and a lower layer comprising water and acid from the composition and separating the layers.

5. Method of separating sulfuric acid from elemental carbon and oils contained in an impure acid composition comprising from about 1 percent to 50 percent by weight of acid together with water and said carbon and oils which method comprises mixing the composition at a temperature between 25° C. and 100° C. with from 10 to 25 parts by volume of diethyl ether per 85 parts by volume of said impure acid composition, maintaining the mixture of ether and said composition in a relatively quiescent state to facilitate the formation of an upper layer which is predominantly ether having oil from the composition in solution and elemental carbon from the composition in suspension and a lower layer comprising water and acid from the composition, separating the layers, distilling said upper layer to recover the ether, separating such solids as may be in said lower layer from the fluids and distilling water from said fluids to yield concentrated acid.

6. Method of separating sulfuric acid from elemental carbon and oils contained in a composition comprising water together with said acid, carbon and oils which method comprises mixing the composition with diethyl ether, in an amount sufficient to form a separate layer, which layer contains oil from the composition in solution and elemental carbon from the composition in suspension and separating said layer from the remainder of the composition.

7. Method of separating sulfuric acid from elemental carbon and oils contained in a composition comprising water and an alcohol containing from 2 to 4 carbon atoms together with said acid, carbon and oils which method comprises mixing the composition with diethyl ether, in an amount sufficient to form a separate layer, which layer contains oil from the composition in solution and elemental carbon from the composition in suspension, and separating said layer from the remainder of the composition.

8. Method of separating sulfuric acid from elemental carbon and oils contained in a composition comprising water together with said acid, carbon and oils which method comprises mixing the composition with diisopropyl ether, in an amount sufficient to form a separate layer, which layer contains oil from the composition in solution and elemental carbon from the composition in suspension and separating said layer from the remainder of the composition.

9. Method of separating sulfuric acid from elemental carbon and oils contained in a composition comprising water and an alcohol containing from 2 to 4 carbon atoms together with said acid, carbon and oils which method comprises mixing the composition with diisopropyl ether, in an amount sufficient to form a separate layer, which layer contains oil from the composition in solution and elemental carbon from the composition in suspension, and separating said layer from the remainder of the composition.

10. Method of separating sulfuric acid from elemental carbon and oils contained in a composition comprising water together with said acid, carbon and oils which method comprises mixing the composition with a lower alkyl ether having a boiling point below 100° C. at 1 atmosphere in an amount exceeding the solubility of the ether in the impure acid, said amount being sufficient to form a separate layer having oil from the composition in solution and elemental carbon from the composition in suspension and separating said layer from the remainder of the composition.

11. Method of separating sulfuric acid from elemental carbon and oils contained in a composition comprising water and an alcohol containing from 2 to 4 carbon atoms together with said acid, carbon and oils which method comprises mixing the composition with a lower alkyl ether having a boiling point below 100° C. at 1 atmosphere in an amount exceeding the solubility of the ether in the impure acid, said amount being sufficient to form a separate layer having oil from the composition in solution and elemental carbon from the composition in suspension and separating said layer from the remainder of the composition.

References Cited in the file of this patent

UNITED STATES PATENTS

| | | |
|---|---|---|
| 2,036,299 | Robinson | Apr. 7, 1936 |
| 2,304,280 | Read | Dec. 8, 1942 |
| 2,320,242 | Kokatnur | May 25, 1943 |
| 2,387,519 | Lillard et al. | Oct. 23, 1945 |

FOREIGN PATENTS

| | | |
|---|---|---|
| 388,467 | Germany | Jan. 14, 1924 |